United States Patent
Kobiki et al.

(10) Patent No.: US 9,761,159 B2
(45) Date of Patent: Sep. 12, 2017

(54) IMAGE PROCESSOR, IMAGE PROJECTOR, AND IMAGE PROCESSING METHOD

(71) Applicant: KABUSHIKI KAISHA TOSHIBA, Tokyo (JP)

(72) Inventors: Hisashi Kobiki, Kanagawa (JP); Wataru Watanabe, Kanagawa (JP); Yuma Sano, Kanagawa (JP); Masahiro Baba, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 69 days.

(21) Appl. No.: 14/691,772

(22) Filed: Apr. 21, 2015

(65) Prior Publication Data

US 2015/0363917 A1    Dec. 17, 2015

(30) Foreign Application Priority Data

Jun. 13, 2014    (JP) .................. 2014-122382

(51) Int. Cl.
*H04N 9/31*  (2006.01)
*G09G 3/00*  (2006.01)
*G06F 3/042*  (2006.01)

(52) U.S. Cl.
CPC .......... *G09G 3/002* (2013.01); *G06F 3/0425* (2013.01); *H04N 9/3179* (2013.01); *H04N 9/3194* (2013.01); *G09G 2320/0247* (2013.01); *G09G 2354/00* (2013.01); *G09G 2360/145* (2013.01)

(58) Field of Classification Search
None
See application file for complete search history.

(56) References Cited

U.S. PATENT DOCUMENTS

| | | | |
|---|---|---|---|
| 2010/0157254 A1 | 6/2010 | Ishii | |
| 2011/0243380 A1* | 10/2011 | Forutanpour | G06F 3/017 382/103 |
| 2012/0105813 A1* | 5/2012 | Todoroki | H04N 9/3194 353/69 |
| 2012/0320158 A1* | 12/2012 | Junuzovic | G06F 3/017 348/46 |

(Continued)

FOREIGN PATENT DOCUMENTS

| | | |
|---|---|---|
| JP | 2009-064110 | 3/2009 |
| JP | 2012-028877 | 2/2012 |

(Continued)

OTHER PUBLICATIONS

Kobiki et al., U.S. Appl. No. 14/570,237, filed Dec. 15, 2014.
English-language machine translation of JP2012-127993.

*Primary Examiner* — Nicholas R Wilson
(74) *Attorney, Agent, or Firm* — Nixon & Vanderhye, P.C.

(57) ABSTRACT

According to one embodiment, an image processor includes: a detector; a calculator; and a corrector. The detector calculates a state signal indicating whether or not an operation is being performed on a projection surface where an image is projected. The calculating is based on information relating to the projection surface. The calculator calculates a correction parameter based on the state signal and the information relating to the projection surface. The corrector generates a corrected image based on the correction parameter and an image to be processed.

15 Claims, 9 Drawing Sheets

(56) References Cited

U.S. PATENT DOCUMENTS

| | | | | |
|---|---|---|---|---|
| 2013/0229396 A1* | 9/2013 | Huebner | ............. | H04N 9/3147 345/207 |
| 2015/0084930 A1 | 3/2015 | Watanabe et al. | | |
| 2015/0208052 A1 | 7/2015 | Kobiki et al. | | |

FOREIGN PATENT DOCUMENTS

| | | |
|---|---|---|
| JP | 2012-127993 | 7/2012 |
| JP | 2015-064724 | 4/2015 |
| JP | 2015-138048 | 7/2015 |

* cited by examiner

IMAGE PROCESSOR, IMAGE PROJECTOR, AND IMAGE PROCESSING METHOD

CROSS-REFERENCE TO RELATED APPLICATIONS

This application is based upon and claims the benefit of priority from Japanese Patent Application No. 2014-122382, filed on Jun. 13, 2014; the entire contents of which are incorporated herein by reference.

FIELD

Embodiments described herein relate generally to an image processor, an image projector, and an image processing method.

BACKGROUND

When projecting an image onto a projection surface using, for example, a projector or the like, a good image can be projected onto any projection surface if processing is performed to correct the image to match the texture pattern of the projection surface and/or changes of the projection surface. On the other hand, there is technology for performing an operation input by an operation (a gesture) using an object (e.g., a finger, a pointer, etc.) performed on a projection image projected onto the projection surface. For example, a switch that is displayed in the projection image can be pressed virtually by a finger, a pointer, etc.

However, when performing such an operation input, if the finger, the pointer, or a shadow formed by the finger or the pointer is undesirably determined to be a portion of the projection image, the processing of correcting the image to match the texture pattern of the projection surface and the changes of the projection surface cannot be executed appropriately. As a result, when the operation input is being performed by the finger, the pointer, etc., the image unnecessarily changes and flickers; and the quality of the image decreases.

Accordingly, when the operation input is performed on the projection image, it is desirable to suppress changes and flickering of the projection image during the operation input.

DETAILED DESCRIPTION

Figure 1:
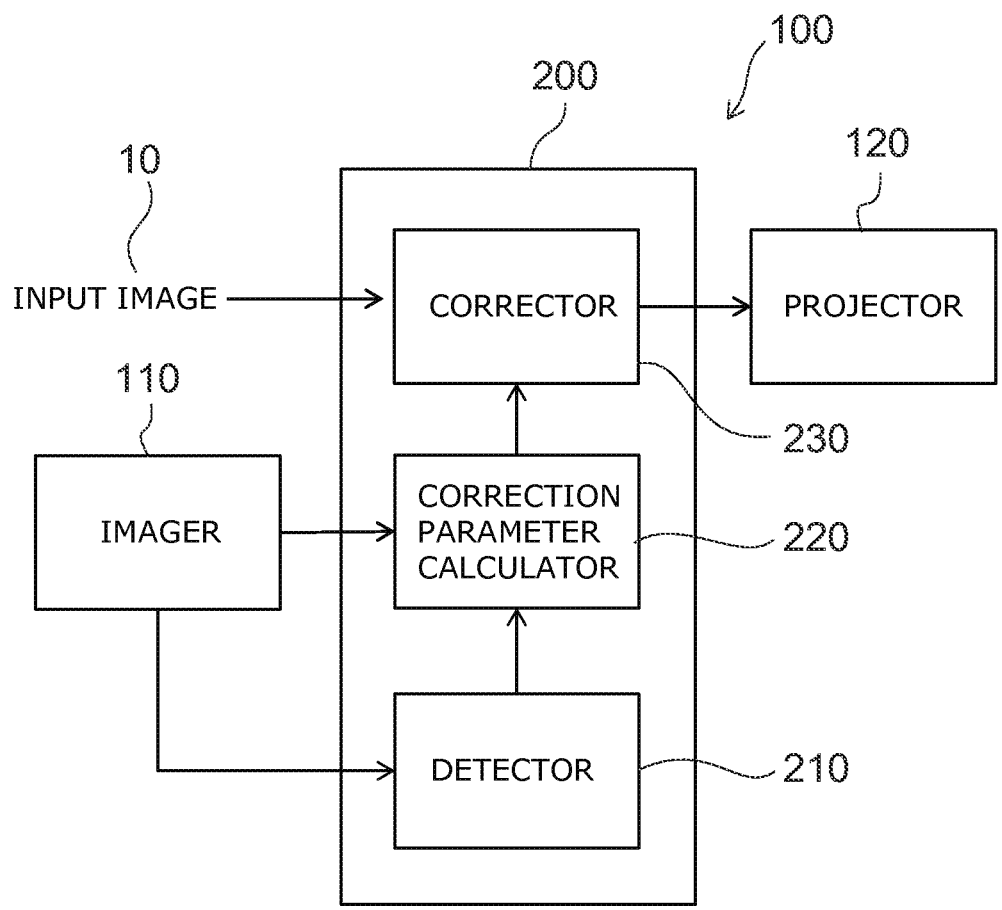
FIG. 1 is a block diagram showing an image processor and an image projector according to an embodiment.

In general, according to one embodiment, an image processor includes: a detector; a calculator; and a corrector. The detector calculates a state signal indicating whether or not an operation is being performed on a projection surface where an image is projected. The calculating is based on information relating to the projection surface. The calculator calculates a correction parameter based on the state signal and the information relating to the projection surface. The corrector generates a corrected image based on the correction parameter and an image to be processed.

Embodiments of the invention will now be described with reference to the drawings. Similar components in the drawings are marked with like reference numerals, and a detailed description is omitted as appropriate.

FIG. 1 is a block diagram showing an image processor and an image projector according to an embodiment.

The block diagram of the image processor shown in FIG. 1 is an example of the relevant component of the image processor according to the embodiment and does not necessarily match the configuration of an actual program module. This is similar for the relevant components of the image processors shown in FIG. 3, FIG. 5, and FIG. 7 as well.

The image projector 100 shown in FIG. 1 includes an image processor 200, an imager 110, and a projector 120.

The image processor 200 includes a detector 210, a correction parameter calculator (also called simply a "calculator") 220, and a corrector 230.

The image processor 200 may be an external device different from the image projector 100 or may be a device included in the image projector 100. The hardware configuration shown in FIG. 1 is an example; and a portion of the image processor 200 or the entire image processor 200 according to the embodiments may be realized as an integrated circuit such as LSI (Large Scale integration), etc., or an IC (Integrated Circuit) chipset. Each functional block may be provided with a processing feature individually; or some or all of the functional blocks may be provided with processing features by being integrated. The integrated circuit is not limited to LSI and may be realized using a dedicated circuit or a general-purpose processor. This is similar for the image processors and the image projectors shown in FIG. 3, FIG. 5, and FIG. 7 as well.

The image projector 100 projects an image onto a projection surface outside the image projector 100. The projection surface includes not only general projection screens but also projection surfaces having a texture pattern and/or colors such as an indoor/outdoor wall surface, a floor, a ceiling, etc.

Various formats may be envisaged for the signal of an input image (a processing image) 10. In the embodiment, each pixel has the three channels of luminance of a red component, a green component, and a blue component as the pixel value. The luminance of each channel at a position (u, v) in the screen is referred to as a luminance value I(u, v). In such a case, the signal of each channel may be calculated by performing a linear transformation from a nonlinear gradation value. For example, the signal of each channel may be calculated from an input signal using the YCbCr transmission standard of the International Telecommunication Union, etc. The signal of the input image 10 may be the signal of an image input from all sorts of devices or media. For example, the signal of the input image 10 may be at least one of a signal of an image input from a recording medium such as a HDD, etc., a signal input from an external device connected via a network, a signal of an image input from a broad cast wave such as TV (television), etc. The input image 10 includes, for example, a video image or a static image.

The imager 110 includes a visible light camera and measures an image including at least a portion of the projection surface. The imager 110 outputs the measured image to the detector 210. Also, the imager 110 outputs the measured image to the correction parameter calculator 220.

In the specification of the application, the "measured image" refers to an image measured by imaging the image radiated from the projector 120 and projected onto the projection surface.

The detector 210 calculates a state signal indicating the state of the projection surface based on information relating to the projection surface output from the imager 110; and the detector 210 outputs the state signal to the correction parameter calculator 220.

When the state signal indicates that the operation input is not being performed, the correction parameter calculator 220 calculates the correction parameter based on the measured image including at least a portion of the projection surface and outputs the correction parameter to the corrector 230.

The corrector 230 generates a corrected image based on the input image 10 and the correction parameter output from the correction parameter calculator 220; and the corrector 230 outputs the corrected image to the projector 120.

Based on the corrected image output from the corrector 230, the projector 120 projects an image corresponding to the corrected image onto the projection surface. The projector 120 may be, for example, a general projector such as a liquid crystal projector, a laser projector, etc. Or, the projector 120 may be connected as an external device that is independent of the image processor 200.

Figure 2:
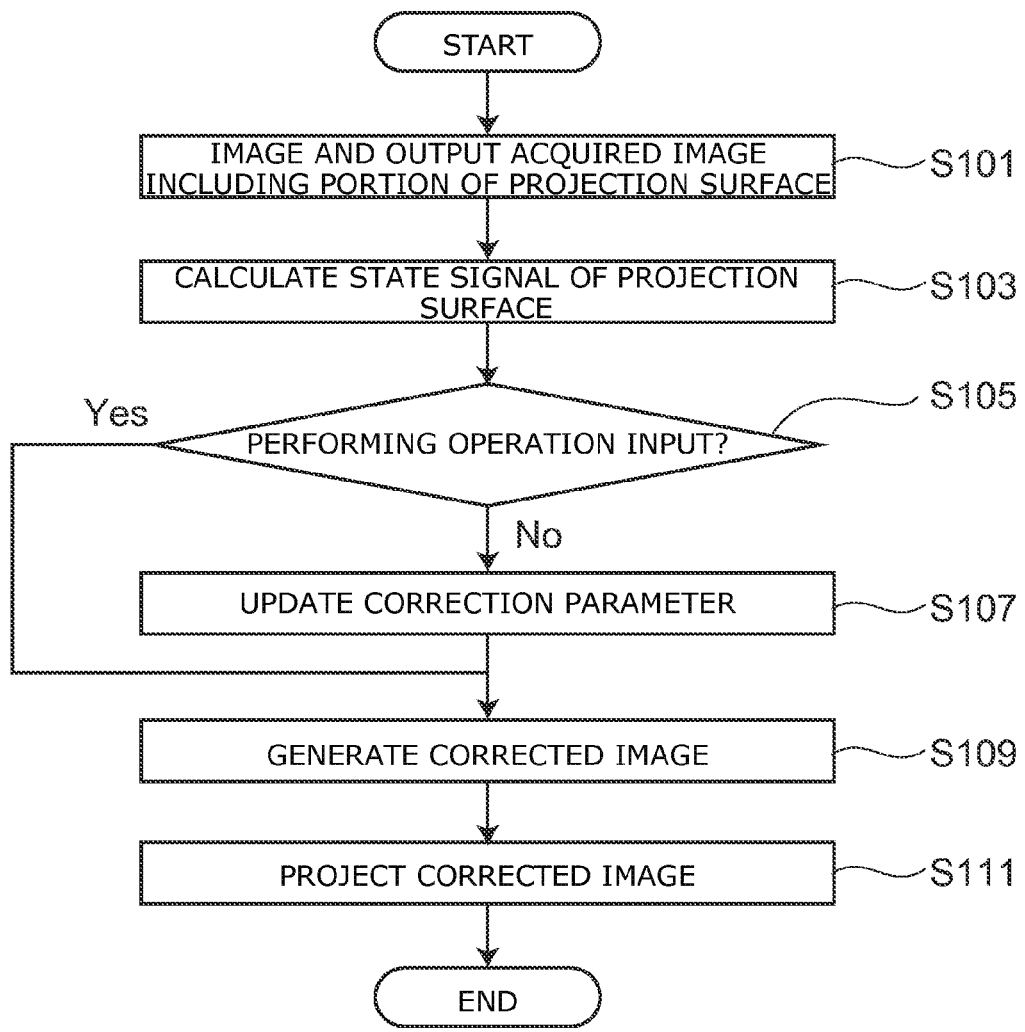
FIG. 2 is a flowchart describing an image processing method according to the embodiment.

FIG. 2 is a flowchart describing an image processing method according to the embodiment.

The imager 110 performs imaging using a visible light camera to measure an image including at least a portion of the projection surface; and the imager 110 outputs the measured image to the detector 210 and the correction parameter calculator 220 (step S101). The "measured image" is as described above in regard to FIG. 1. The projection image that is radiated from the projector 120 is affected by the material of the projection surface, the shape of the projection surface, etc. Therefore, the brightness of the projection image and the color of the projection image change according to the material of the projection surface, the shape of the projection surface, etc.

In the specification of the application, the "projection image" refers to the image radiated from the projector 120 and projected onto the projection surface.

The imager 110 may measure as the measured image a region that includes the projection image and has a surface area greater than the surface area of the projection image.

By the imager 110 imaging the image projected onto the projection surface, it can be known how the color of the projection image and/or the brightness of the projection image changed due to the effects of the projection surface.

The correction parameter calculator 220 can calculate the correction parameter based on the measured image that is imaged by the imager 110.

The detector 210 calculates the state signal indicating the state of the projection surface based on the information relating to the projection surface output from the imager 110 and outputs the state signal to the correction parameter calculator 220 (step S103).

In the specification of the application, the "information relating to the projection surface" refers to information by which it can be discriminated whether or not an object exists in the space between the projector 120 and the projection surface.

In the specification of the application, the "object" is not limited to, for example, an indicator such as a finger, a pointer, etc., and includes, for example, a projection image formed by a light projector such as a laser pointer or the like that is independent of the image projector 100.

In the embodiment, an image (a measured image) that is radiated from the projector 120 in a direction toward the projection surface is assumed as the information relating to the projection surface. The information relating to the projection surface may be information in which the distance to the object existing in the space between the projector 120 and the projection surface is measured using a stereo camera, a distance sensor, etc.

In the specification of the application, the "state signal" refers to information (a signal) indicating whether or not the operation input is being performed by the object existing in the space between the projector 120 and the projection surface.

It is desirable for the determination of whether or not the operation input is being performed to be executed by detecting a temporal fluctuation amount of a portion of the image (the measured image) or the entire image that is imaged by the imager 110. For example, in the case where a state continues for a constant interval in which the temporal fluctuation amount of the measured image is not more than a predetermined threshold, the detector 210 determines that the operation input is not being performed. On the other hand, in the case where the temporal fluctuation amount of the measured image is larger than the predetermined threshold, the detector 210 determines that the operation input is being performed.

The determination of whether or not the operation input is being performed may be executed by detecting a shadow occurring due to the object existing in the space between the projector 120 and the projection surface based on the information relating to the projection surface. For example, the detector 210 detects the shadow occurring due to the object existing in the space between the projector 120 and the projection surface; and in the case where a state continues for a constant interval in which the temporal fluctuation amount of the shadow is not more than a predetermined threshold, the detector 210 determines that the operation input is not being performed. On the other hand, in the case where the temporal fluctuation amount of the shadow is larger than the predetermined threshold, the detector 210 determines that the operation input is being performed. The "temporal fluctuation amount of the shadow" includes, for example, the temporal fluctuation amount of the surface area of the region of the shadow, etc.

The determination of whether or not the operation input is being performed may be executed based on the measured image by detecting, for example, a projection image from a light projector such as a laser pointer or the like that is independent of the image projector 100. For example, the detector 210 detects the projection image; and in the case where a state continues for a constant interval in which the temporal fluctuation amount of the projection image is not more than a predetermined threshold, the detector 210 determines that the operation input is not being performed. On the other hand, in the case where the temporal fluctuation amount of the projection image is larger than the predetermined threshold, the detector 210 determines that the operation input is being performed.

The correction parameter calculator 220 determines whether or not the state signal output from the detector 210 indicates that the operation input is being performed (step S105). In the case where the state signal indicates that the operation input is not being performed (step S105: No), the correction parameter calculator 220 calculates (updates) the correction parameter based on the measured image output from the imager 110 and outputs the correction parameter to the corrector 230 (step S107). On the other hand, in the case where the state signal indicates that the operation input is being performed (step S105: Yes), the correction parameter calculator 220 does not calculate (update) the correction parameter.

Thus, the correction parameter calculator 220 calculates the correction parameter based on the measured image output from the imager 110 only in the case where the state signal output from the detector 210 indicates that the operation input is not being performed. Thereby, the changing and flickering of the projection image that occurs when the correction parameter is updated when the operation input is performed is suppressed; and the quality of the projection image can be maintained.

The correction parameter is a parameter calculated based on the measured image output from the imager 110. As described above in regard to FIG. 1, the measured image is the image measured by imager 110 that is radiated from the projector 120 and projected onto the projection surface. The imager 110 measures the state in which the brightness of the projection image and/or the color of the projection image radiated from the projector 120 is changed by the effects of the material of the projection surface, the shape of the projection surface, etc. In the embodiment, the correction parameter calculator 220 calculates the correction parameter by comparing the image measured by the imager 110 in the state of the changed projection image and the measured image measured by the imager 110 in the state of the projection image in a predetermined reference environment and causing the projection image projected onto the projection surface to approach the projection image of the reference environment.

The corrector 230 generates the corrected image based on the input image 10 and the correction parameter output from the correction parameter calculator 220; and the corrector 230 outputs the projector 120 (step S109).

The projector 120 projects the image corresponding to the corrected image onto the projection surface based on the corrected image output from the corrector 230 (step S111).

According to the embodiment, the decrease of the quality of the image due to the operation input occurring when the correction parameter is updated when the operation input is not being performed on the projection surface can be suppressed. Thereby, a high-quality image in which the effects of the texture pattern, etc., are suppressed can be projected onto various projection surfaces.

Figure 3:
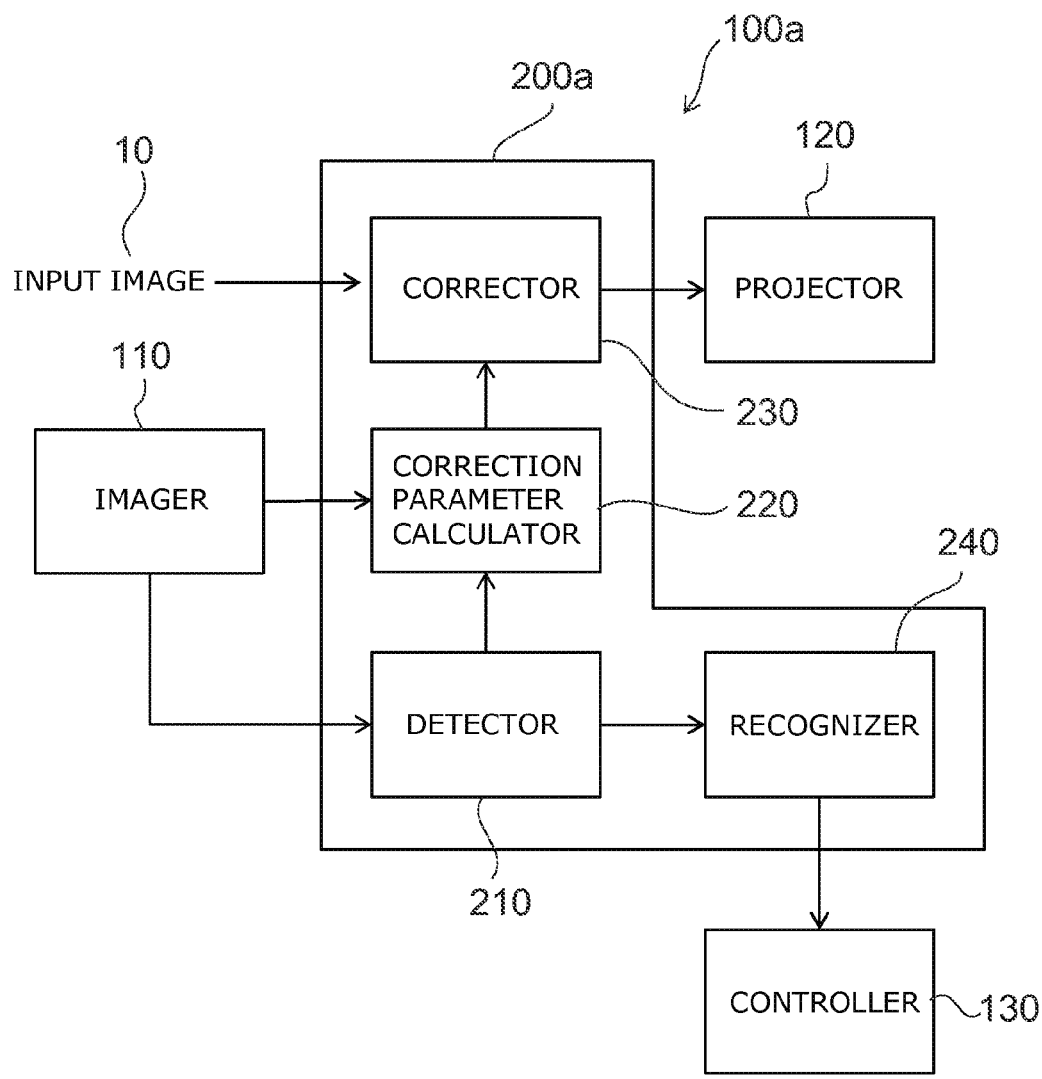
FIG. 3 is a block diagram showing another image processor and another image projector according to the embodiment.

FIG. 3 is a block diagram showing another image processor and another image projector according to the embodiment.

Figure 4:
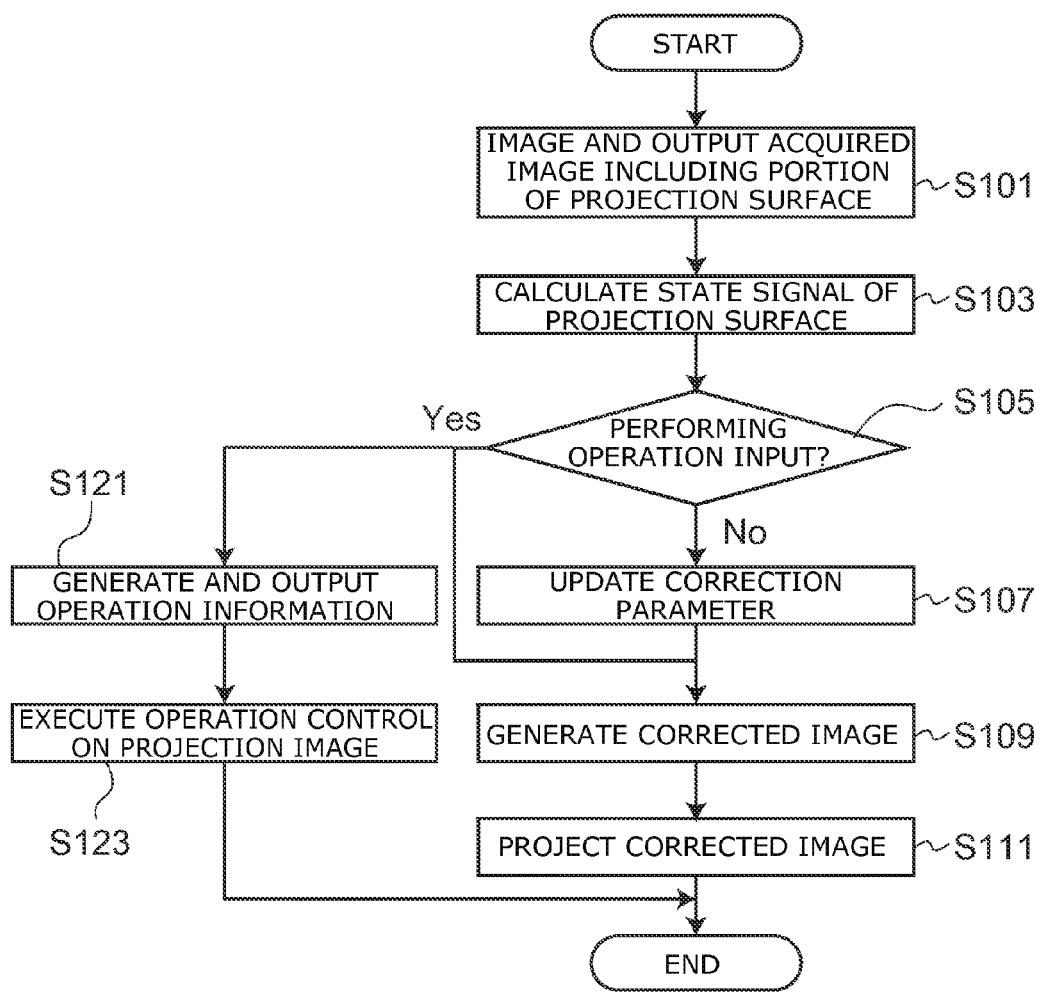
FIG. 4 is a flowchart describing the image processing method according to the embodiment.

FIG. 4 is a flowchart describing the image processing method according to the embodiment.

Compared to the image projector 100 described above in regard to FIG. 1, the image projector 100a shown in FIG. 3 further includes a controller 130. Compared to the image processor 200 described above in regard to FIG. 1, the image processor 200a shown in FIG. 3 further includes a recognizer 240.

In the example shown in FIG. 3 and FIG. 4, the detector 210 calculates the state signal indicating the state of the projection surface based on the information relating to the projection surface and outputs the state signal to the correction parameter calculator 220 and the recognizer 240.

In the case where the state signal output from the detector 210 indicates that the operation input is being performed on the projection surface (step S105: Yes), the recognizer 240 generates the operation information relating to the operation content based on the state signal and outputs the operation information to the controller 130 (step S121). The operation content may be any general operation content performed using an indicator. For example, the operation content may be general operation content including a click operation of a button displayed by an input system including a graphical user interface, a drag operation, the use of multi-touch to select an image range, enlarge/reduce an image, etc.

The controller 130 performs an operation control of the projection image based on the operation information output from the recognizer 240 (step S123). For example, an operating system (OS) is contained in the controller 130. The controller 130 may be connected as an external device existing independently of the image processor 200a. For example, the controller 130 may be provided as a portion of an interface of an input device to which the image processor 200a is connected. In the embodiment, it is assumed that the controller 130 is prepared as the input module of a system to which the image processor 200a is connected.

The operations of step S101, step S103, step S105, step S107, step S109, and step S111 shown in FIG. 4 are as described above in regard to FIG. 2.

According to the embodiment, the image projector 100a includes the controller 130. The image processor 200a includes the recognizer 240. Thereby, in the case where the state signal output from the detector 210 indicates that the operation input is being performed on the projection surface, it is possible for the recognizer 240 to recognize the operation performed on the projection surface and for the controller 130 to perform the operation control of the projection image. That is, in the embodiment, it is determined whether or not the operation input is being performed; and additionally, in the case where the operation input is being performed, the recognizer 240 can recognize the operation content and the controller 130 can execute the operation control.

Figure 5:
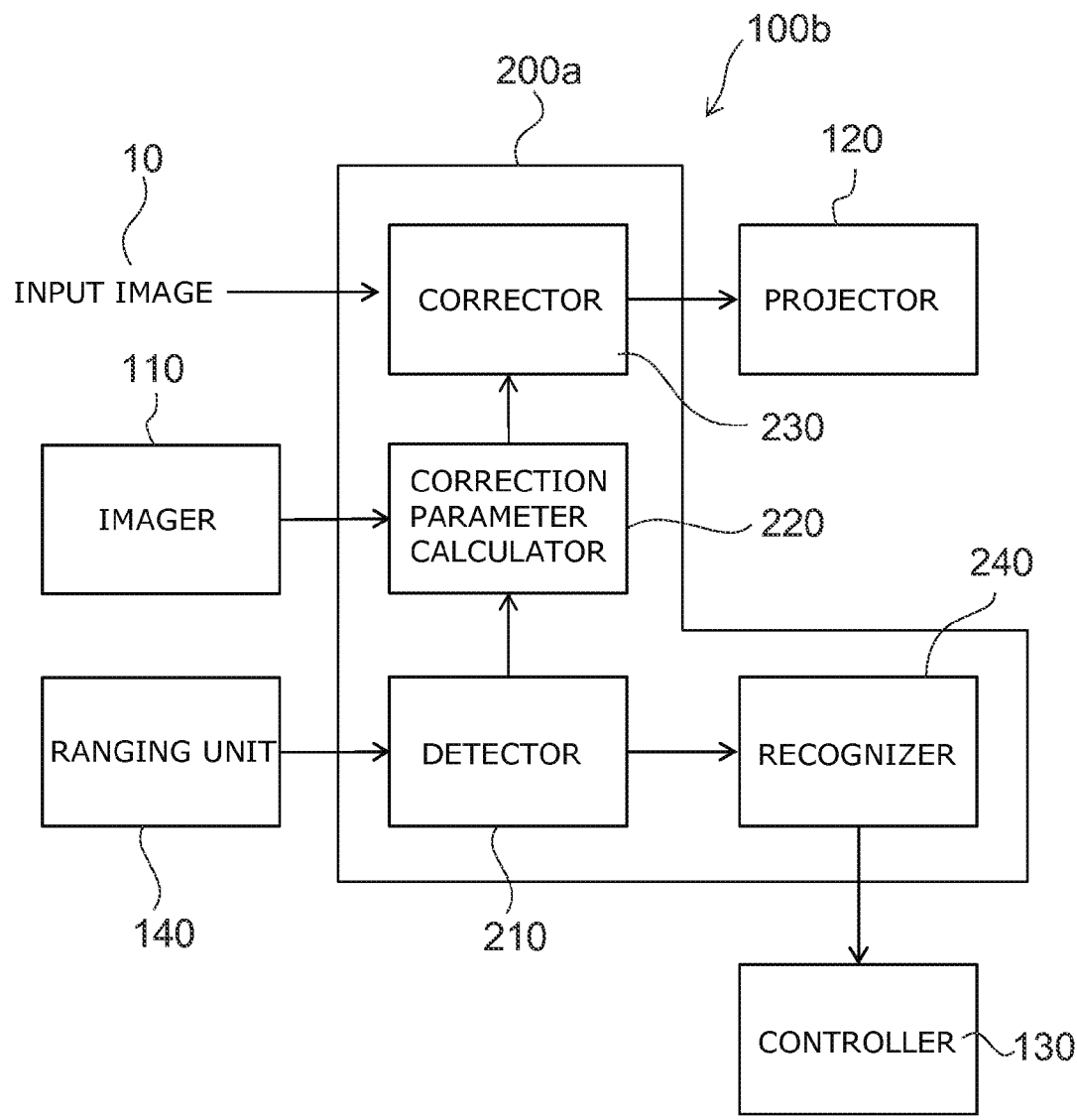
FIG. 5 is a block diagram showing another image processor and another image projector according to the embodiment.

FIG. 5 is a block diagram showing another image processor and another image projector according to the embodiment.

Figure 6:
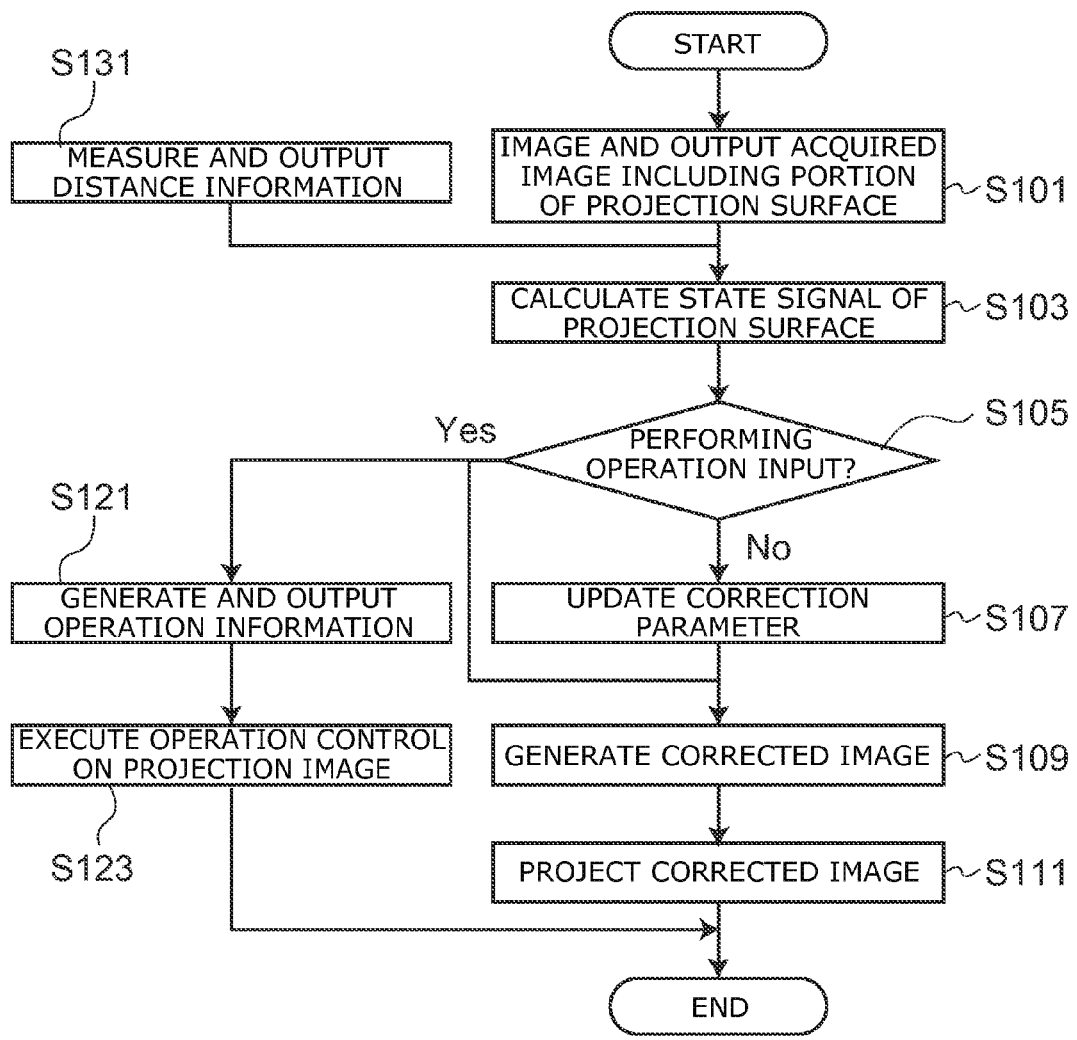
FIG. 6 is a flowchart describing another image processing method according to the embodiment.

FIG. 6 is a flowchart describing another image processing method according to the embodiment.

Compared to the image projector 100a shown in FIG. 3, the image projector 100b shown in FIG. 5 further includes a ranging unit 140. The image projector 100b includes the image processor 200a. The image processor 200a is as described above in regard to FIG. 3 and FIG. 4.

The ranging unit 140 measures distance information to an object existing between the projector 120 and the projection surface and outputs the distance information to the detector 210 (step S131). In other words, the ranging unit 140 measures distance information relating to a distance to an object including at least a portion of the projection surface and outputs the distance information to the detector 210 (step S131). A general device that measures the distance between the sensor and the object is used as the ranging unit 140. For example, it is desirable to use a device such as a time of flight sensor that measures the distance by detecting the phase difference between the radiated light and the detected light as the ranging unit 140. Or, it is desirable to use a device such as an infrared sensor that measures the distance by projecting and detecting non-visible light as the ranging unit 140. Or, it is desirable to use a device such as a stereo camera that measures the distance based on the output of multiple sensors as the ranging unit 140. Further, it is desirable for the ranging unit 140 to calculate the distance information of the positions of objects in a constant range in at least a portion of the projection surface.

In the example shown in FIG. 5 and FIG. 6, the detector 210 can calculate the state signal of the projection surface based on the distance information output from the ranging unit 140 (step S103). In the case where a time of fight sensor, an infrared sensor, or the like is used as the ranging unit 140, the ranging unit 140 can measure the distance information without interference from the projection image projected from the projector 120; and the distance information can be measured with higher precision.

The detector 210 calculates the state signal indicating the state of the projection surface based on the distance information (the distance information to the object existing between the projector 120 and the projection surface) output from the ranging unit 140; and the detector 210 outputs the state signal to the correction parameter calculator 220 and the recognizer 240.

The state signal that is calculated by the detector 210 includes information indicating whether or not the operation input is being performed by the object existing in the space between the projector 120 and the projection surface. It is desirable for the determination of whether or not the operation input is being performed to be executed by detecting a temporal fluctuation amount of a portion of the distance information output by the ranging unit 140 or the entire distance information. For example, in the case where a state continues for a constant interval in which the temporal fluctuation amount of the distance information is not more than a predetermined threshold, the detector 210 determines that the operation input is not being performed. On the other hand, in the case where the temporal fluctuation amount of the distance information is larger than the predetermined threshold, the detector 210 determines that the operation input is being performed.

That is, in the example shown in FIG. 5 and FIG. 6, the detector 210 calculates the state signal based on the distance information output from the ranging unit 140 rather than the image imaged by the imager 110.

The operations of step S101, step S105, step S107, step S109, step S111, step S121, and step S123 shown in FIG. 6 are as described above in regard to FIG. 2 and FIG. 4.

According to the embodiment, the image projector 100*b* includes the ranging unit 140. Thereby, the detector 210 calculates the state signal based on the distance information output from the ranging unit 140. The correction parameter calculator 220 updates the correction parameter in the case where the operation input is not being performed. On the other hand, the correction parameter calculator 220 does not update the correction parameter in the case where the operation input is being performed. Therefore, the changing and flickering of the projection image when performing the operation input is suppressed; and the quality of the projection image can be maintained. Also, it is possible for the user, etc., to more stably perform the operation performed on the projection surface.

Figure 7:
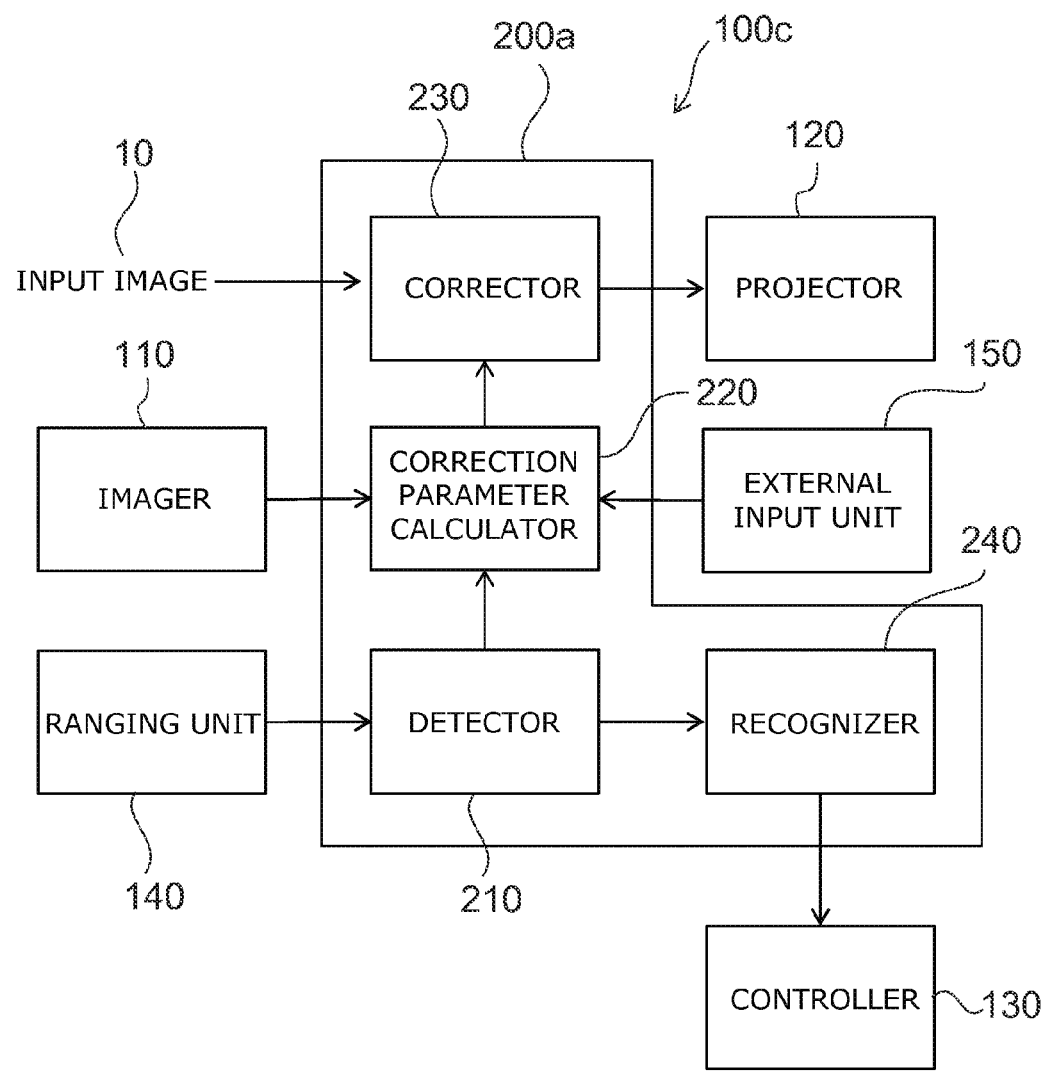
FIG. 7 is a block diagram showing another image processor and another image projector according to the embodiment.

FIG. 7 is a block diagram showing another image processor and another image projector according to the embodiment.

Figure 8:
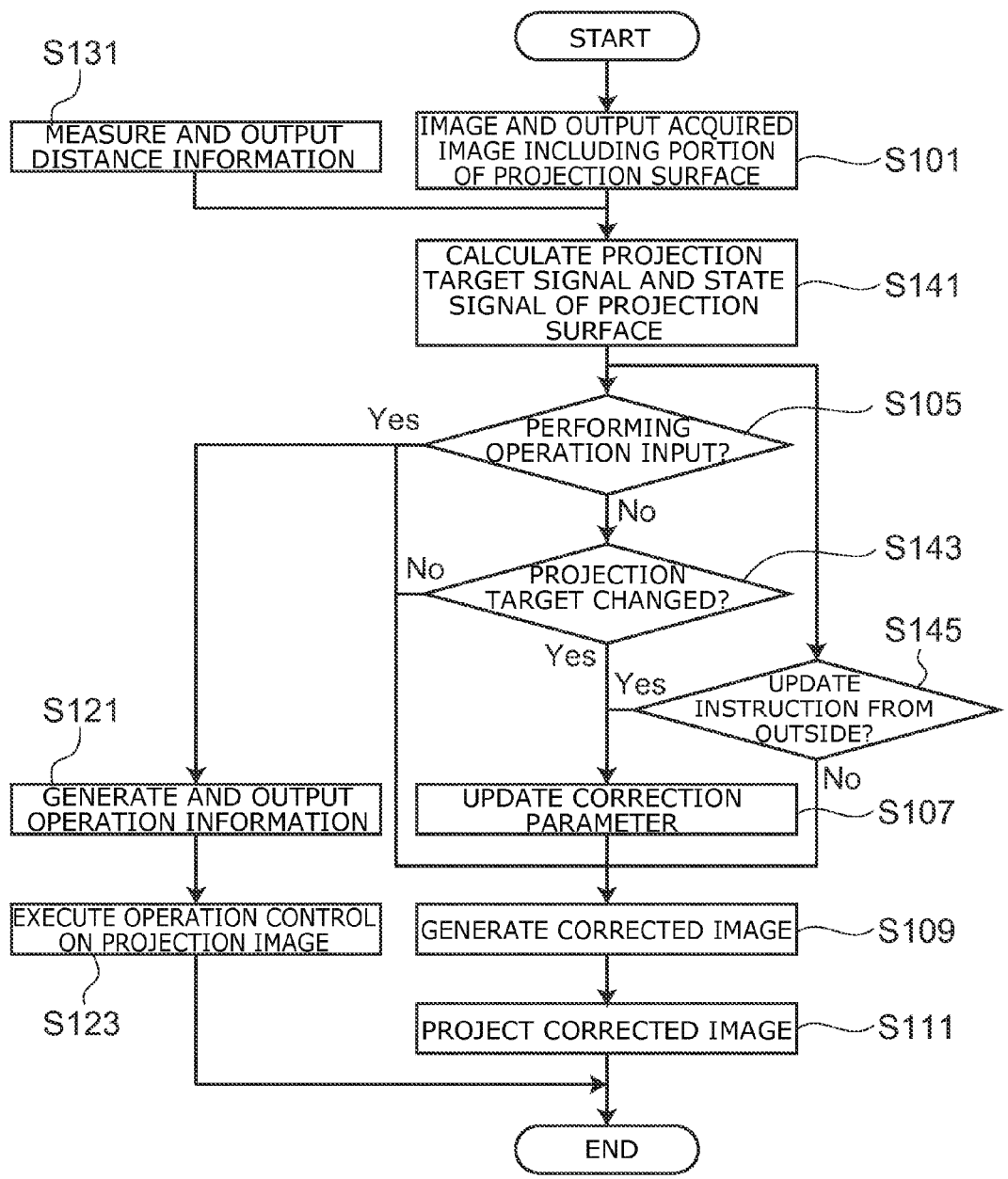
FIG. 8 is a flowchart describing another image processing method according to the embodiment.

FIG. 8 is a flowchart describing another image processing method according to the embodiment.

Figure 9:
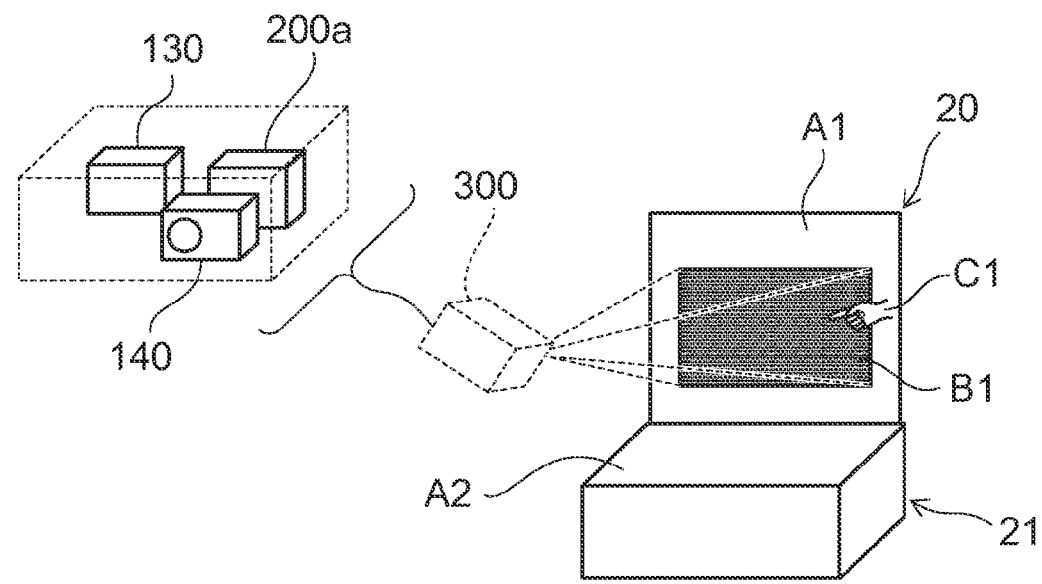
FIG. 9 is a schematic perspective view showing examples of the state of use of the image projector according to the embodiment.
Figure 10:
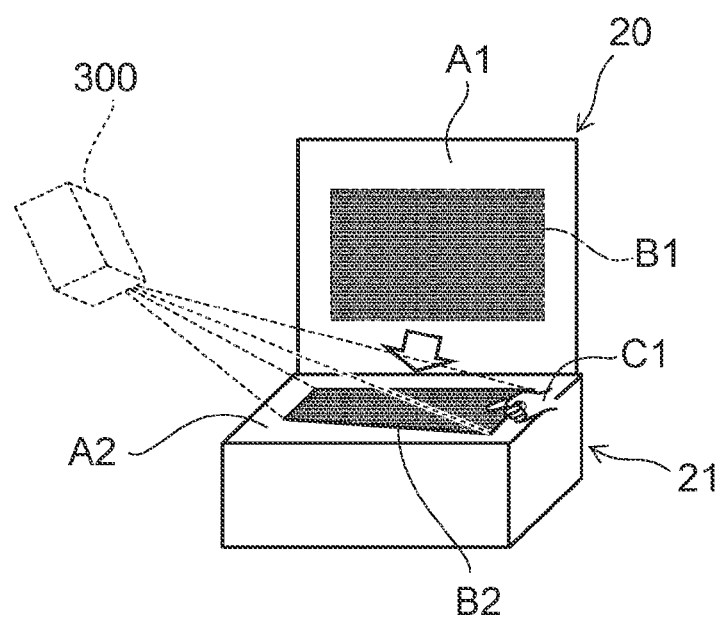
FIG. 10 is a schematic perspective view showing examples of the state of use of the image projector according to the embodiment.

FIG. 9 and FIG. 10 are schematic perspective views showing examples of the state of use of the image projector according to the embodiment.

Compared to the image projector 100*b* shown in FIG. 5, the image projector 100*c* shown in FIG. 7 further includes an external input unit 150. The image projector 100*c* includes the image processor 200*a*. The image processor 200*a* is as described above in regard to FIG. 3 to FIG. 6.

In addition to the operations described above in regard to FIG. 5 and FIG. 6, the detector 210 calculates the projection target signal indicating whether or not the projection target has changed based on the distance information output by the ranging unit 140; and the detector 210 outputs the projection target signal to the correction parameter calculator 220 (step S141).

In the specification of the application, the "projection target signal" refers to a signal that indicates whether or not the projection target (the projection surface) onto which the projector 120 projects the image has changed.

The change of the projection target will now be described with reference to FIG. 9 and FIG. 10.

FIG. 9 is a schematic perspective view showing an example of the state before the change of the projection target. FIG. 10 is a schematic perspective view showing an example of the state after the projection target has changed.

The case is described in the examples shown in FIG. 9 and FIG. 10 where the image processor 200*a*, the ranging unit 140, and the controller 130 are included in one housing 300. However, the embodiment is not limited thereto. The image processor 200*a* and the controller 130 may be disposed at mutually-separated locations.

An object 20 shown in FIG. 9 has a surface A1. An object 21 has a surface A2. The surface A1 and the surface A2 are object surfaces that may be the object of the operation detection. For example, the surface A1 is a wall surface. For example, the surface A2 is a desk upper surface. In the embodiment, the object surfaces that are used as the object of the operation detection are described as being planes. The embodiment is not limited thereto. In the embodiment, the object surface may be non-planar and may include an unevenness.

A measurement range B1 shown in FIG. 9 is the range of the distance measured by the ranging unit 140. An indicator C1 is, for example, an object such as a finger, a pointer, etc. The indicator C1 performs an operation on the object such as the surface A1, the surface A2, etc. In the embodiment, the operation by the indicator C1 in the measurement range B1 is detected.

FIG. 10 shows the state in which the position or orientation (position/orientation) of the housing 300 has changed. The measurement range B1 changes to a measurement range B2 as the position or orientation of the housing 300 changes. Thus, in the case where the position/orientation of the housing 300 changes, it is desirable for the image processor 200*a* to automatically update the reference distance and modify the object surface used as the object of the operation detection from the surface A1 to the surface A2.

It is desirable for the determination of whether or not the projection target has changed to be executed by detecting the temporal fluctuation amount of a portion of the distance information or the entire distance information output from the ranging unit 140. For example, in the case where a state continues for a constant amount of time in which the overall average value of the temporal fluctuation amount of the distance information is larger than a predetermined threshold, the detector 210 determines that the projection target has changed. On the other hand, in the case where a state continues for a constant interval in which the overall average value of the temporal fluctuation amount of the distance information is not more than the predetermined threshold, the detector 210 determines that the projection target has not changed.

Thus, it is possible for the image processor 200a to detect the state in which the direction of the projector 120 changes or the projection surface moves by the detector 210 detecting whether or not the projection target has changed. Thereby, it is possible for the correction parameter calculator 220 to update the correction parameter at an appropriate timing.

The detector 210 is not limited to calculating the projection target signal based on the distance information output by the ranging unit 140. The determination of whether or not the projection target has changed may not be executed by detecting the temporal fluctuation amount of a portion of the distance information or the entire distance information output from the ranging unit 140. For example, the detector 210 may calculate the projection target signal based on the information relating to the projection surface output from the imager 110. That is, the determination of whether or not the projection target has changed may be executed by detecting the temporal fluctuation amount of some or all of the colors of the image imaged by the imager 110.

For example, in the case where a state continues for a constant amount of time in which the temporal fluctuation amount of the measured image is larger than the predetermined threshold, the detector 210 determines that the projection target has changed. On the other hand, in the case where a state continues for a constant interval in which the temporal fluctuation amount of the measured image is not more than the predetermined threshold, the detector 210 determines that the projection target has not changed.

Or, for example, in the case where a state continues for a constant amount of time in which an illumination fluctuation amount estimated based on the measured image is larger than a predetermined threshold, the detector 210 determines that the projection target has changed. On the other hand, in the case where a state continues for a constant interval in which the illumination fluctuation amount estimated based on the measured image is not more than the predetermined threshold, the detector 210 determines that the projection target has not changed.

Or, for example, in the case where the imager 110 measures, as the measured image, a region that includes the projection image and has a surface area greater than the surface area of the projection image, the determination of whether or not the projection target has changed may be executed by detecting the temporal fluctuation amount of a portion inside the measured image around the projection image. In the case where a state continues for a constant amount of time in which the temporal fluctuation amount of the portion inside the measured image around the projection image is larger than the predetermined threshold, the detector 210 determines that the projection target has changed. On the other hand, in the case where a state continues for a constant interval in which the temporal fluctuation amount of the portion inside the measured image around the projection image is not more than the predetermined threshold, the detector 210 determines that the projection target has not changed.

Thus, the determination of whether or not the projection target has changed may be executed based on a signal output not from a sensor but from a visible light camera.

The external input unit 150 receives an input of an update signal from the outside instructing to update the correction parameter; and the external input unit 150 outputs the update signal to the correction parameter calculator 220. The input of the update signal from the outside is realized by a device or interface that updates the correction parameter at a timing suited to a change of the environment around the image processor 200a. For example, the external input unit 150 may output the update signal based on an instruction of a user. Or, for example, the external input unit 150 may output the update signal based on an output of an acceleration sensor. The acceleration sensor can detect the change of the position/orientation of the image projector 100c.

In addition to the operations described above in regard to FIG. 5 and FIG. 6, the correction parameter calculator 220 calculates and outputs the correction parameter based on the projection target signal output from the detector 210 and the update signal output from the external input unit 150. In the case where the projection target signal indicates that the projection target has changed (step S143: Yes), the correction parameter calculator 220 performs an operation so that the update of the correction parameter is continued for a constant interval from the timing of receiving the projection target signal (step S107). In the case where the update signal prompts the update of the correction parameter (step S145: Yes), the correction parameter calculator 220 performs an operation so that the update of the correction parameter is continued for a constant interval from the timing of receiving the update signal (step S107).

In the embodiment, the operations of the correction parameter calculator 220 that are based on the state signal, the projection target signal, and the update signal are described as being independent. However, the correction parameter calculator 220 may perform the update of the correction parameter based on a combination of the states of the state signal, the projection target signal, and the update signal. It is desirable for the correction parameter calculator 220 to determine the timing of updating the correction parameter based on at least one of the state signal, the projection target signal, or the update signal.

The operations of step S101, step S105, step S107, step S109, step S111, step S121, step S123, and step S123 shown in FIG. 8 are as described above in regard to FIG. 2, FIG. 4, and FIG. 6.

According to the embodiments, the image projector 100c includes the external input unit 150. The image processor 200a includes the detector 210 and the correction parameter calculator 220. Thereby, the correction parameter calculator 220 can update the correction parameter at a timing suited to a change of the environment around the image processor 200a or an instruction input from a user. The projector 120 can appropriately project the corrected image according to the change of the environment around the image processor 200a and/or the instruction input from the user.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processor, comprising:
one or more processors configured to at least:
receive an image signal to be processed and first information, wherein the first information represents a distance to an object existing in a space between a projector and a projection surface;
detect that an operation is not being performed on the projection surface based on the first information and generate a state signal based on the detecting;
generate a correction parameter for correcting color and/or brightness of the image signal, the correction parameter being generated based on the state signal and the first information; and
generate a corrected image signal to be projected to the projection surface based on the correction parameter and the image signal.

2. The image processor according to claim 1, wherein the one or more processors are configured to determine that the operation is not being performed by detecting a temporal fluctuation amount of the first information.

3. The image processor according to claim 2, wherein the one or more processors are configured to determine that the operation is not being performed based on a state in which the temporal fluctuation amount of the first information is not more than a threshold for a constant interval.

4. The image processor according to claim 1, wherein the one or more processors are configured to generate, based on the first information, a projection target signal indicating that a projection target where the image is projected has not changed.

5. The image processor according to claim 4, wherein the one or more processors are configured to determine the correction parameter based on the projection target signal indicating that the projection target has changed.

6. The image processor according to claim 4, wherein the one or more processors are configured to determine that the projection target has not changed by detecting a temporal fluctuation amount of the first information.

7. The image processor according to claim 6, wherein the one or more processors are configured to determine that the projection target has not changed based on a state in which the temporal fluctuation amount of the first information is not more than the threshold for a first interval of time.

8. The image processor according to claim 1, further comprising an imager configured to acquire a measured image including at least a portion of the projection surface where the image is projected,
the first information including the measured image.

9. The image processor according to claim 1, wherein the one or more processors are further configured to generate operation information relating to content of the operation based on the state signal.

10. An image projector, comprising:
an image processor including one or more processors configured to at least:
receive an image signal to be processed and first information, wherein the first information represents a distance to an object existing in a space between a projector and a projection surface;
detect that an operation is not being performed on a projection surface based on the first information and calculate a state signal based on the detecting,
generate a correction parameter for correcting color and/or brightness of the image signal, the correction parameter being generated based on the state signal and the first information, and
generate a corrected image signal to be projected to the projection surface based on the correction parameter and the image signal; and
a projector projecting a corrected image based on the corrected image signal.

11. The image projector according to claim 10, wherein the one or more processors are configured to determine that the operation is not being performed by detecting a temporal fluctuation amount of the first information.

12. The image projector according to claim 11, wherein the one or more processors are configured to determine that the operation is not being performed based on a state in which the temporal fluctuation amount of the first information is not more than a threshold for a first time interval.

13. An image processing method, comprising:
receiving an image signal to be processed and first information, wherein the first information represents a distance to an object existing in a space between a projector and to a projection surface;
detecting that an operation is not being performed on the projection surface based on the first information and calculating a state signal based on the detecting;
generating a correction parameter for correcting color and/or brightness of the image signal, the correction parameter being generated based on the state signal and the first information; and
generating a corrected image signal to be projected to the projection surface based on the correction parameter and the image signal.

14. The method according to claim 13, wherein determining that the operation is not being performed is executed by detecting a temporal fluctuation amount of the first information.

15. The method according to claim 14, including determining that the operation is not being performed based on a state in which the temporal fluctuation amount of the first information is not more than a threshold for a first time interval.

* * * * *